(12) United States Patent
Bin et al.

(10) Patent No.: US 11,855,568 B2
(45) Date of Patent: Dec. 26, 2023

(54) MOTOR DRIVING DEVICE AND METHOD FOR CONTROLLING SAME

(71) Applicants: Hyundai Motor Company, Seoul (KR); Kia Corporation, Seoul (KR)

(72) Inventors: Seung Hyeon Bin, Hwaseong-si (KR); Han Hee Park, Hwaseong-si (KR); Seong Min Kim, Changwon-si (KR); Ho Rim Choi, Hwaseong-si (KR); Seon Mi Lee, Anyang-si (KR); Sang Woo Park, Seongnam-si (KR); Tae Il Yoo, Seongnam-si (KR); Ho Sun Jang, Chungcheongnam-do (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/868,245

(22) Filed: Jul. 19, 2022

(65) Prior Publication Data

US 2023/0223888 A1   Jul. 13, 2023

(30) Foreign Application Priority Data

Jan. 11, 2022   (KR) .......................... 10-2022-0004227

(51) Int. Cl.
| | |
|---|---|
| *H02P 1/00* | (2006.01) |
| *H02P 3/00* | (2006.01) |
| *H02P 5/00* | (2016.01) |
| *H02P 29/028* | (2016.01) |
| *H02P 27/08* | (2006.01) |
| *H02P 25/22* | (2006.01) |

(52) U.S. Cl.
CPC ............ *H02P 29/028* (2013.01); *H02P 25/22* (2013.01); *H02P 27/08* (2013.01)

(58) Field of Classification Search
CPC ......... H02P 29/028; H02P 25/22; H02P 27/08
USPC ....................................................... 318/139
See application file for complete search history.

(56) References Cited

U.S. PATENT DOCUMENTS 8,482,230 B2   7/2013   Bouchez et al.
11,418,142 B2 *   8/2022   Jeong ...................... B60L 50/51
(Continued)

FOREIGN PATENT DOCUMENTS

JP   6285256 B2   2/2018
JP   2019-047670 A   3/2019
(Continued)

*Primary Examiner* — Erick D Glass
(74) *Attorney, Agent, or Firm* — Morgan, Lewis & Bockius LLP (57) ABSTRACT

A motor driving device for driving a motor having multiple windings corresponding to multiple phases, respectively, may include: a first inverter including multiple first switching elements and connected to a first end of each of the multiple windings; a second inverter including multiple second switching elements and connected a second end of each of the multiple windings; a third switching element configured to connect/disconnect points, at which the number of turns of each of the multiple windings is partitioned based on a predetermined ratio, to/from each other; and a controller configured to control, based on the required output of the motor, an on/off state of the first switching elements to the third switching element.

10 Claims, 6 Drawing Sheets

(56) References Cited

U.S. PATENT DOCUMENTS 11,545,923 B2 * 1/2023 Choi .................... H02P 21/141
2009/0033253 A1 2/2009 Nagashima et al.

FOREIGN PATENT DOCUMENTS

JP 6773365 B2 10/2020
KR 10-2021-0122343 A 10/2021

* cited by examiner

MOTOR DRIVING DEVICE AND METHOD FOR CONTROLLING SAME

CROSS-REFERENCE TO RELATED APPLICATION(S)

This application is based on and claims priority under 35 U.S.C. 119 to Korean Patent Application No. 10-2022-0004227, filed on Jan. 11, 2022, in the Korean Intellectual Property Office, the disclosure of which is herein incorporated by reference in its entirety.

TECHNICAL FIELD

The present disclosure relates to a motor driving device and a method for controlling the same and, more specifically, to a motor driving device and a method for controlling the same, such that a motor may be switched, based on a system-required output, to a Y-connection motor driving mode and an open-end winding motor driving mode, and may safely cope with malfunction of an inverter.

BACKGROUND

Typically, U-, V-, and W-phase windings included in a three-phase alternating current motor may form a Y-connection neutral terminal in which one-side ends of the windings are connected to one inverter and the other-side ends thereof are connected to each other.

When the three-phase motor is driven, switching elements in the inverter may apply a line voltage to Y-connected windings of the motor while being turned on/off by pulse width modulation (PWM) control, to generate alternating current, thereby generating torque.

The fuel efficiency (electric efficiency) of an eco-friendly vehicle, such as an electric vehicle, using the torque generated by the motor is determined based on power conversion efficiency of an inverter-motor, and thus it is important to maximize the power conversion efficiency of the inverter and the efficiency of the motor in order to improve fuel efficiency.

The efficiency of an inverter-motor system is mainly determined by the voltage use rate of the inverter. When an operating point of a vehicle, determined based on the relationship between a motor speed and motor torque, is formed in a section in which the voltage use rate is high, the fuel efficiency of the vehicle may be improved.

However, when the number of windings of the motor increases in order to increase the maximum torque of the motor, the section in which the voltage use rate is high may be far away from a low torque region which is a main operating point of the vehicle, and thus the fuel efficiency may become low. Furthermore, when a design is made for including a main operating point in the section in which the voltage use rate is high in terms of fuel efficiency, there may be a limitation on the maximum torque of the motor, and thus the accelerating ability of the vehicle may be reduced.

Therefore, a motor driving technology capable of the efficiency of the system while covering low-output and high-output sections by one motor has been required.

The above descriptions regarding background technologies have been made only to help understanding of the background of the present disclosure, and are not to be deemed by those skilled in the art to correspond to already-known prior arts.

SUMMARY

An aspect of the present disclosure is to provide a motor driving device and a method for controlling the same, which may switch, based on a required output of a motor, a motor driving mode to a Y-connection motor driving mode and an open-end winding motor driving mode to improve the efficiency of an inverter for driving the motor, and may stably control the motor even when the inverter malfunctions.

In accordance with an aspect of the present disclosure proposed to solve the above-mentioned problems, a motor driving device may be a motor driving device for driving a motor having multiple windings corresponding to multiple phases, respectively, and may include: a first inverter including multiple first switching elements and connected to a first end of each of the multiple windings; a second inverter including multiple second switching elements and connected a second end of each of the multiple windings; a third switching element configured to connect or disconnect the second inverter to or from the motor; and a controller configured to implement a first driving mode in which the motor is driven solely by the first inverter among the first inverter and the second inverter through control of the third switching element and a second driving mode in which the motor is driven by the first inverter and the second inverter, the controller having a torque limit table corresponding to each driving mode and being configured to switch the torque limit table to a first driving mode torque limit table when the second inverter malfunctions in the second driving mode.

The third switching element may be provided between the second inverter and the second ends of the multiple windings.

The controller may turn on the third switching element in the first driving mode such that the third switching element acts as a Y-connection neutral terminal, and may turn off the third switching element in the second driving mode such that the motor is driven through the first inverter and the second inverter.

The controller may switch, when the second inverter malfunctions in the second driving mode, the torque limit table to the first driving mode torque limit table and then control the third switching element to disconnect the second inverter from the motor.

The torque limit table may be a data table into which the speed of turn of the motor and an inverter-side input voltage are input and from which the maximum control torque of the motor is output.

The controller may switch the torque limit table to the first driving mode torque limit table when pulse width modulation control of the second inverter is impossible during malfunction of the second inverter in the second driving mode.

The controller may control the motor to be in the first driving mode when a required output of the motor is lower than a predetermined reference value, and may control the motor to be in the second driving mode when the required output of the motor is higher than the predetermined reference value.

The controller may be configured to control the motor based on the first driving mode torque limit table.

A method for controlling the motor driving device may include may include: sensing whether a second inverter malfunctions in a second driving mode by a controller; switching a torque limit table to a first driving mode torque limit table by the controller when the second inverter malfunctions; and driving a motor by the controller through a first inverter, based on the first driving mode torque limit table.

In the driving of the motor through the first inverter, the controller may switch the torque limit table to the first driving mode torque limit table and then control a third switching element such that the motor is driven through the first inverter.

The motor driving device and the method for controlling the same, according to the present disclosure, may improve the efficiency in an entire torque section compared with the case in which a conventional typical Y-connection motor is driven by one inverter, and thus may contribute to improving vehicle fuel efficiency.

Particularly, in an open-end winding driving mode to perform pulse width modulation control for all of two inverters, even when one inverter malfunctions, the motor may be stably driven by the motor through the other inverter, thereby improving system stability and traveling convenience.

The effects obtainable in the present disclosure are not limited to the above-mentioned effects, and other effects, which have not been mentioned above, will be clearly understood by those skilled in the art, to which the present disclosure belongs, from the following description.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, a motor driving device according to various embodiments of the present disclosure will be described in detail with reference to the accompanying drawings.

Figure 1:
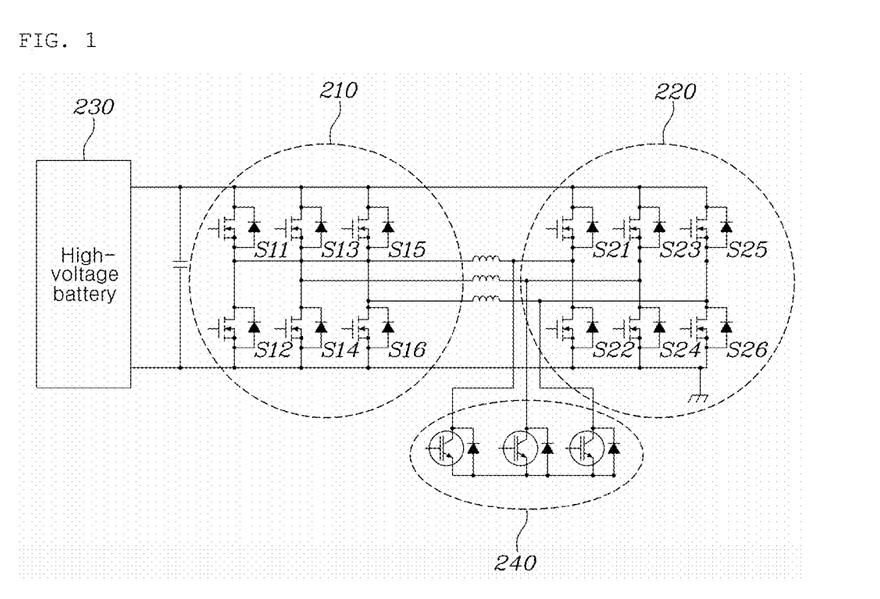
FIGS. 1 and 2 are circuit views of a motor driving device according to an embodiment of the present disclosure.
Figure 2:
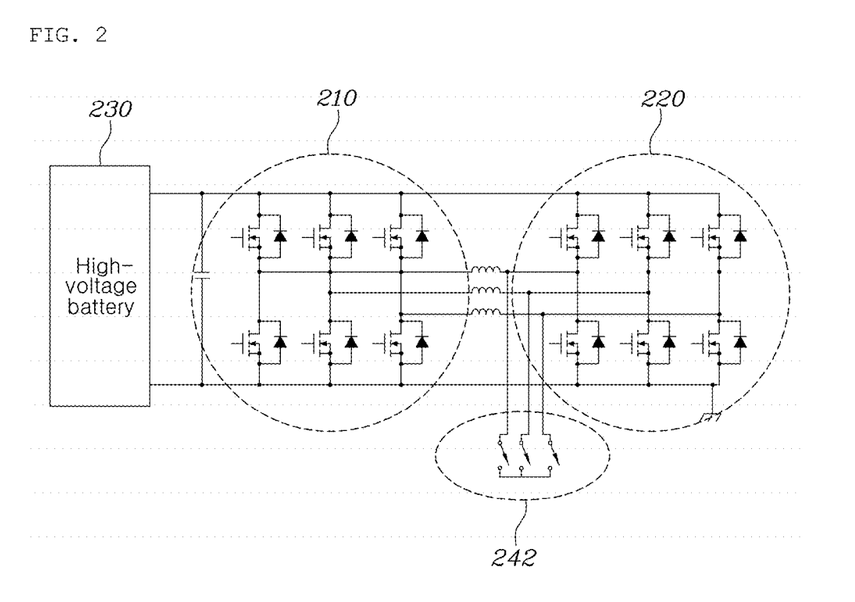

FIGS. 1 and 2 are circuit views of a motor driving device according to an embodiment of the present disclosure.

Referring to FIG. 1, a motor driving device according to an embodiment of the present disclosure may be a motor driving device for supplying driving power to a motor 400 (shown in FIG. 3) having multiple windings corresponding to multiple phases, and may include: a first inverter 210 including multiple first switching elements S11-S16 and connected to a first end of each of the windings of the motor 400; and a second inverter 220 including multiple second switching elements S21-S26 and connected a second end of each of the windings of the motor 400.

Furthermore, the motor driving device may include: a third switching element 240 configured to connect/disconnect the motor 400 to/from the second inverter 220; and a controller 120 configured to control, based on a required output of the motor 400, the on/off state of the first switching elements S11-S16, the second switching elements S21-S26, and the third switching element 240.

The controller according to an illustrative embodiment of the present disclosure may be implemented through a non-volatile memory (not shown) configured to store data on an algorithm configured to control operations of various elements of a vehicle or on software commands for reproducing the algorithm, and a processor (not shown) configured to perform operations, which will be described below, by using the data stored in the memory. The memory and the processor may be implemented as separate chips. Alternatively, the memory and the processor may be implemented as a single chip in which the memory and the processor are integrated with each other, and the processor may take the form of one or more processors.

The first inverter 210 and the second inverter 220 may convert direct current power stored in a battery 230 to three-phase alternating current power and may provide the three-phase alternating current power to the motor 400. Alternatively, the first inverter 210 and the second inverter 220 may convert, to direct current power, regenerative braking energy generated due to occurrence of regenerative braking torque of the motor 400 at the time of regenerative braking, and may provide the direct current power to the battery 230. The conversion between the direct current power and the alternating current power may be performed by pulse width modulation control of the multiple first switching elements S11-S16 and the multiple second switching elements S21-S26 included in the first inverter 210 and the second inverter 220.

The first inverter 210 may include multiple legs to which a direct current voltage formed in a direct current link capacitor connected between both ends of the battery 230 is applied. The legs may be electrically connected to multiple phases of the motor 400, respectively. More specifically, a first leg may include two switching elements S11 and S12 connected to each other in series between both ends of the direct current capacitor, and a connection node of the two switching elements S11 and S12 may be connected to one end of a one-phase winding in the motor 400 such that alternating current power corresponding to one of the multiple phases is input or output. Likewise, a second leg may include two switching elements S13 and S14 connected to each other in series between both ends of the direct current capacitor, and a connection node of the two switching elements S13 and S14 may be connected to one end of a one-phase winding in the motor 400 such that alternating current power corresponding to one of the multiple phases is input or output. Furthermore, a third leg may include two switching elements S15 and S16 connected to each other in series between both ends of the direct current capacitor, and a connection node of the two switching elements S15 and S16 may be connected to one end of a one-phase winding in the motor 400 such that alternating current power corresponding to one of the multiple phases is input or output.

The second inverter 220 may also have a configuration similar to that of the first inverter 210. The second inverter 220 may include multiple legs to a direct current voltage formed in a direct current link capacitor connected between both ends of the battery 230. The legs may be electrically connected to the multiple phases of the motor 400, respectively. More specifically, a first leg may include two switching elements S21 and S22 connected to each other in series between both ends of the direct current capacitor, and a connection node of the two switching elements S21 and S22 may be connected to one end of a one-phase winding in the motor 400 such that alternating current power corresponding to one of the multiple phases is input or output. Likewise, a second leg may include two switching elements S23 and S24 connected to each other in series between both ends of the direct current capacitor, and a connection node of the two switching elements S23 and S24 may be connected to one end of a one-phase winding in the motor 400 such that alternating current power corresponding to one of the multiple phases is input or output. Furthermore, a third leg may include two switching elements S25 and S26 connected to each other in series between both ends of the direct current capacitor, and a connection node of the two switching elements S25 and S26 may be connected to one end of a one-phase winding in the motor 400 such that alternating current power corresponding to one of the multiple phases is input or output.

The first inverter 210 may be connected to one end of each of the windings of the motor 400, and the second inverter 220 may be connected to the other end of the winding of the motor 400. That is, both ends of each of the windings of the motor 400 may be electrically connected to the first inverter 210 and the second inverter 220, respectively, in an open-end winding scheme.

In an embodiment of the present disclosure, the third switching element 240 may be arranged to be connected to each phase between the motor 400 and the second inverter 220. The embodiment in FIG. 1 shows an example of an electronic switch, and FIG. 2 shows that the third switching element 240 is a mechanical switch.

When the third switching element 240 is turned off, the motor 400 may be driven in an open-end winding (OEW) mode, thereby achieving a high output. When the third switching element 240 is turned on, the windings of the motor 400 may form Y-connection between in a position in which the third switching element 240 is connected, and may constitute a neutral terminal. For example, when the third switching element 240 is turned on, when all the multiple switching elements S21-S26 of the second inverter 220 are turned off and are not operated, and when the first inverter 210 operates to drive the motor 400, the motor 400 may be driven through a single inverter.

The third switching element 240 may employ various switching means, such as a MOSFET, an IGBT, a thyristor, and a relay, known in the corresponding technical field.

Fundamentally, the controller 120 may be an element for performing pulse width modulation control for the switching elements S11-S16 and S21-S21 included in the first inverter 210 and the second inverter 220 such that the motor 400 can be driven based on a required output of the motor 400. Particular, in various embodiments of the present disclosure, the controller 120 may determine, based on the required output of the motor 400, an inverter which is to be used for motor driving the motor 400, may determine, based on the determination, the on/off state of the third switching element 240, and may perform pulse width modulation control for a switching element of an inverter, the driving of which has been determined.

Figure 3:
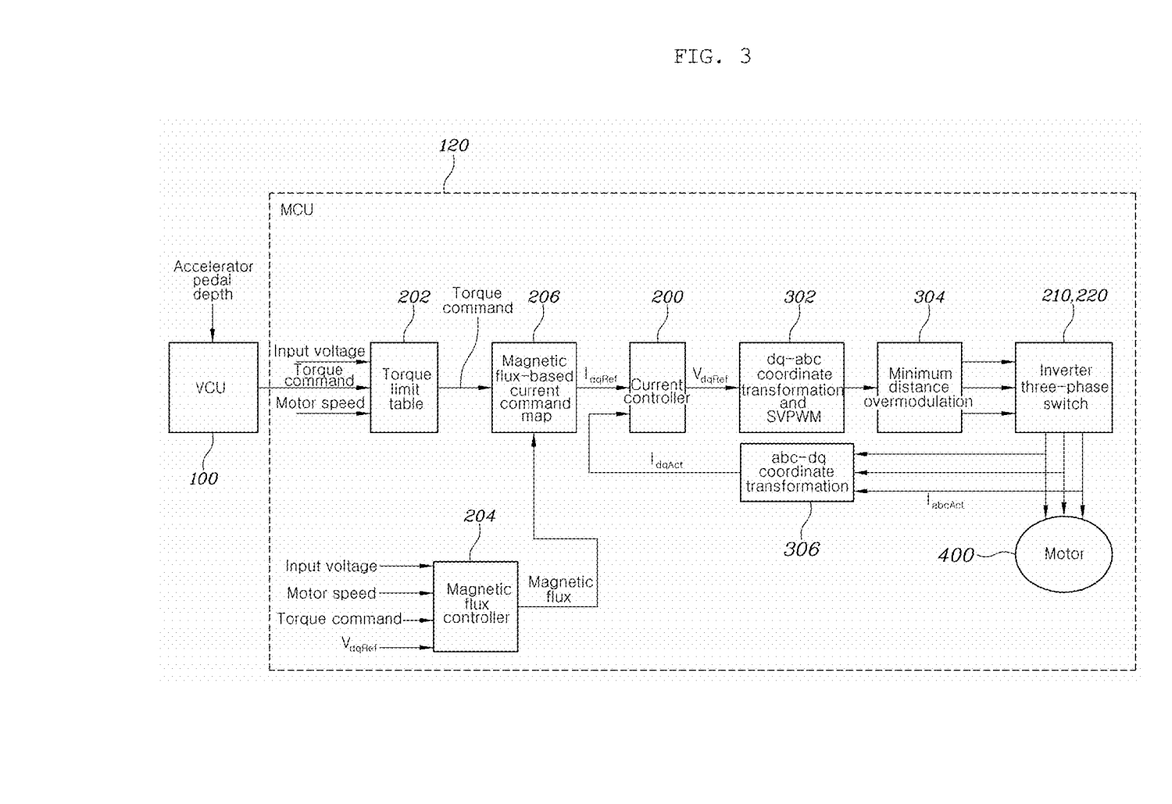
FIG. 3 illustrates a configuration of a controller of a motor driving device according to an embodiment of the present disclosure.

FIG. 3 illustrates a configuration of a controller 120 of a motor driving device according to an embodiment of the present disclosure. An output required by a driver may be input through a VCU (Vehicle Control Unit) 100, and may be input into a torque limit table 202 by a torque command together with an input terminal voltage of a first inverter and the number of turns of a motor. A torque command under limited torque may be output from the torque limit table 202. The torque command may be input into a magnetic flux-based current command map 206 together with magnetic flux so that required current $I_{dgRef}$ may be derived. In the case of the magnetic flux, an input voltage, a motor speed, a torque command, a required voltage $V_{dqRef}$ may be input into a magnetic controller 204 so that the magnetic flux is derived therefrom.

The derived required current $I_{dgRef}$ and feed-back output current $I_{dqAct}$ may be input into a current controller 200, and a required voltage $V_{dqRef}$ may be output. The required voltage $V_{dqRef}$ may be generated as a coordinate conversion and SVPWM command 302, and then may be input into an inverter through minimum distance overmodulation 304. Thus, a motor 400 may be driven by output current $I_{dqAct}$, and the output current may be coordinate-converted 306 again and fed back to the current controller 200.

When a required output of the motor 400 is lower than a predetermined reference value, the controller 120 may perform pulse width modulation control for the switching elements S11-S16 of the first inverter 210 without operating the second inverter 220, thereby driving the motor 400 (for convenience of a description, referred to as "first driving mode"). At this time, the controller 120 may control the third switching element 240 to be in an ON state. Thus, Y-connection may be formed and the motor may be driven. Like this, various techniques for driving the motor 400 by performing pulse width modulation control for one inverter are already known in the pertinent technical field, a detailed description of a technique for performing pulse width modulation control for an inverter in a first driving mode will be omitted.

When a required output of the motor 400 is higher than the predetermined reference value, the controller 120 may operate both the first inverter 210 and the second inverter 220 to drive the motor 400 (for convenience of a description, referred to as "second driving mode"). At this time, the controller 120 may control the third switching element 240 to be in an OFF state. Thus, one end of the motor 400 may be connected to the first inverter 210, and the other end thereof may be connected to the second inverter 220. That is, in the second driving mode, the motor 400 may become an open-end winding motor in which all of both ends of a winding are opened, and may be driven by performing pulse width modulation control for the two inverters 210 and 220 connected to both ends of the winding, respectively.

The controller 120 may receive direct current voltages of the first inverter 210 and the second inverter 220, phase current detected by a current sensor and provided to the motor 400, and a motor angle detected by a motor rotor sensor (not shown) installed in the motor 400 and perform pulse width modulation control for the first switching elements S11-S16 of the first inverter 210 and the second switching elements S21-S26 of the second inverter 220, whereby the motor driving in the second driving mode may be achieved. Various techniques for performing pulse width modulation control for two inverters connected to both ends of a winding of an open-end winding motor to drive a motor are already known in the pertinent technical field. Therefore, an additional detailed description of pulse width modulation control for inverters, performed in the second driving mode, will be omitted.

As described above, the motor driving device according to an embodiment of the present disclosure may drive, in the first driving mode, a Y-connection motor by controlling the first inverter 210, and may drive, in the second driving mode, an open-end winding motor by controlling the first inverter 210 and the second inverter 220. When the motor 400 is applied to driving of a vehicle, main vehicle operating points may appear as an operating point while traveling in a city and an operating point at the time of traveling on a highway, and these operating points may be included in a region in which the efficiency of a motor-inverter system is high.

The second driving mode is a mode to drive an open-end winding motor, and it is known that in the open-end winding driving, the output of an inverter may be configured to be $\sqrt{3}$ times higher than the case in which a motor having Y-connected windings and having the same number of turns is driven by simply one inverter. That is, when the open-end winding driving, which is the second driving mode, is applied, the number of turns of a motor may be increased by a factor of $\sqrt{3}$, and thus a current output, required for the motor to generate an identical output, may be reduced by a factor of $\sqrt{3}$.

Thus, when the open-end winding driving mode is applied, current of an inverter may be reduced compared with driving of a Y-connection motor in order to generate an identical output, thereby increasing the efficiency, and the number of power semiconductors applied as switching elements may be reduced, thereby reducing material costs.

When the second driving mode is applied, a motor out may increase, and thus it may be difficult that a region, in which the voltage use rate of the motor-inverter system is greater than a predetermined reference value and is determined to be excellent, includes main operating points. Therefore, in a low torque region including the main operating points, an operation of driving the motor 400 in the first driving mode to improve the efficiency may be performed, and in a section requiring a high output, an operation of driving the motor 400 in the second driving mode to relatively reduce inverter output power and reduce the number of power semiconductors used may be performed.

In addition, in order to further improve the efficiency of the first driving mode performed in the low torque region including the main operating points, MOSFETs made of SiC which is a material having a relatively small switching loss may be employed as the switching elements S11-S16 applied to the first inverter 210. On the contrary, IGBTs made of Si which is an inexpensive material may be employed as the switching elements S21-S26 applied to the second inverter 220 operating in the high-output region.

Therefore, when compared with a conventional typical Y-connection motor driven by one inverter, the motor driving device according to an embodiment of the present disclosure may improve the efficiency in the entire torque section, and thus may contribute to improving vehicle fuel efficiency.

Figure 4:
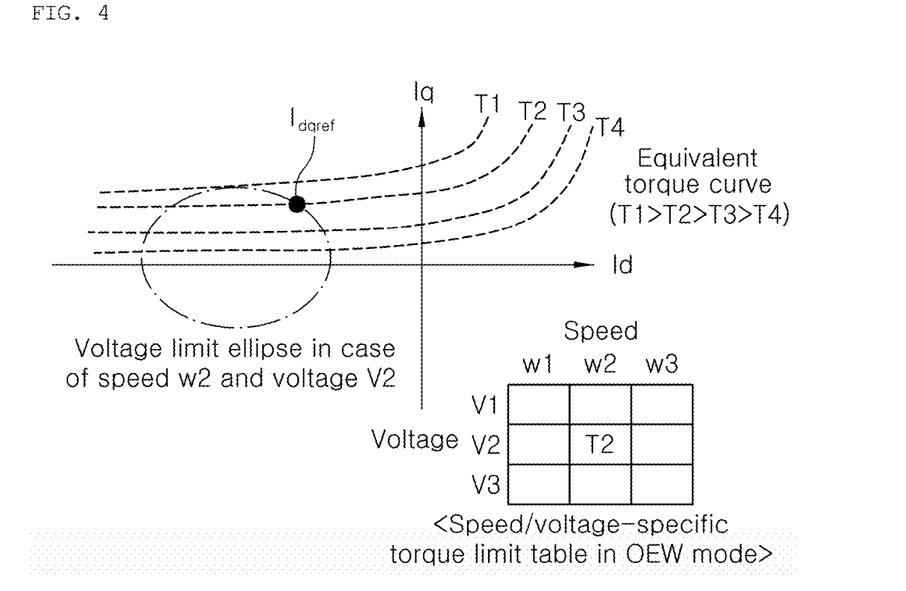
FIGS. 4 and 5 are views illustrating torque limit tables of a controller of a motor driving device according to an embodiment of the present disclosure.
Figure 5:
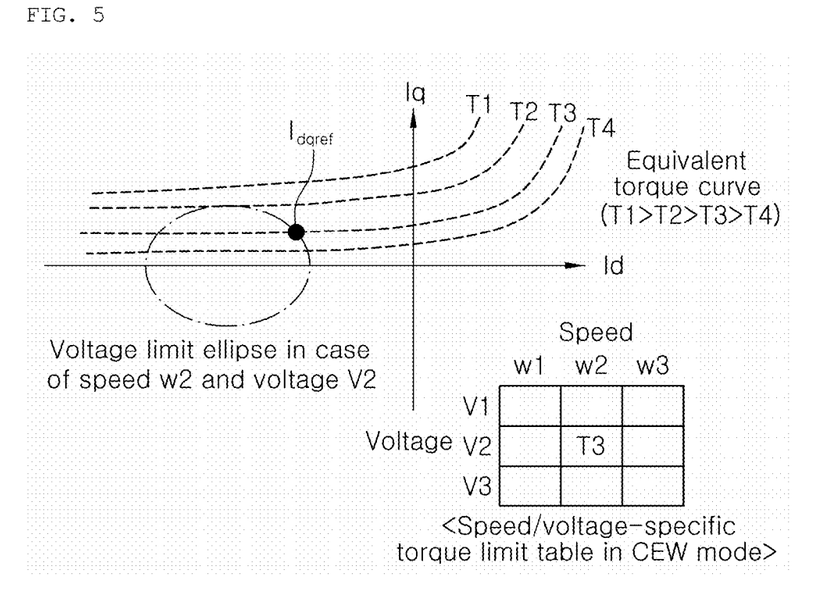

FIGS. 4 and 5 are views illustrating torque limit tables of a controller of a motor driving device according to an embodiment of the present disclosure. As described in FIG. 3, the controller may include a torque limit table, and an output required by a driver, which is required torque, may be input into a torque limit table together with an input terminal voltage of a first inverter and the number (or speed) of turns of a motor. A torque command under limited torque may be output from the torque limit table.

As illustrated in FIG. 4, the maximum magnitude of torque, on which a motor system can perform linear control at a specific speed, may depend on a voltage limit ellipse determined based on a speed and an inverter input DC voltage magnitude. In a region after base RPM of the motor, when an output torque command T based on a voltage/speed-specific torque limit table is received in a motor system vector control structure, a current command within a voltage limit ellipse may be formed on an equivalent torque curve corresponding to T through a magnetic flux-based current command map.

As illustrated in FIG. 4, during normal traveling in the OEW mode (the second driving mode), the controllable maximum torque value is T1 which is the highest point on the ellipse. However, as illustrated in FIG. 5, during a CEW mode (first driving mode) operation after OFF of PWM control for the second inverter, the highest point on the ellipse may go down to T2. Furthermore, this may be a theoretically controllable torque limit value for each mode, and may be limited, in the torque limit tables, to a T2 value and a T3 value, which are smaller than theoretical limit value, in consideration of side effect, such as torque vibration, etc., at the time of driving.

Therefore, a theoretically controllable torque limit value is smaller during the CEW mode operation than in the OEW mode, and thus the torque limit table may also limit the value to a smaller value. Therefore, traveling may be continuously performed, but the magnitude of an output generated at an identical speed may be reduced.

The second inverter may malfunction while the controller operates the motor in the second mode for a high output. Alternatively, during transition to the second driving mode, the second inverter may malfunction, or the malfunction may be found.

In this case, at the time of attempting to control the second inverter while maintaining the torque limit table as a second driving mode torque limit table in FIG. 4, the second inverter may be out of control, and thus the traveling of the vehicle may be stopped, and other related elements may sequentially malfunction.

Therefore, when the second inverter malfunctions, the controller may first switch a torque limit table to the first driving mode torque limit table in FIG. 5, and may control a third switching element to operate the motor in the first driving mode, thereby enabling the minimum traveling although not satisfying the driver's demand and maintaining traveling safety and component durability. Furthermore, the driver may be induced, through a separate warning, etc., to service the vehicle.

Figure 6:
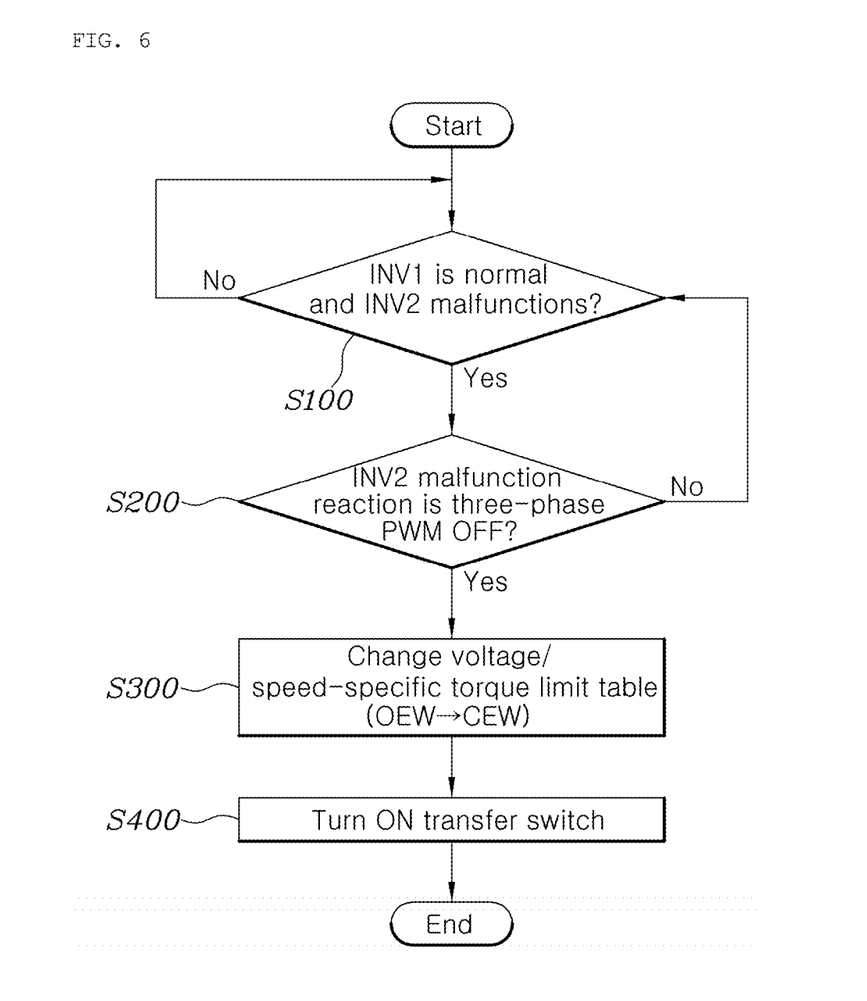
FIG. 6 is a flowchart of a method for controlling a motor driving device according to an embodiment of the present disclosure.

Specifically, FIG. 6 is a flowchart of a method for controlling a motor driving device according to an embodiment of the present disclosure. The method for controlling the motor driving device of the present disclosure may include: sensing whether a second inverter malfunctions in a second driving mode by a controller (S100); switching a torque limit table to a first driving mode torque limit table by the controller when the second inverter malfunctions (S300); and driving a motor by the controller through a first inverter, based on the first driving mode torque limit table (S400).

Furthermore, in the driving of the motor through the first inverter (S400), the controller may switch the torque limit table to the first driving mode torque limit table and then control a third switching element such that the motor is driven through the first inverter.

In the case of controlling the motor in the second driving mode because an output required by a driver is high, when the second inverter malfunctions, the controller may first determine whether the second inverter malfunctions and whether the first inverter operates normally (S100). If the first inverter operates normally but the second inverter malfunctions, the controller may determine whether the malfunction of the second inverter is out of PWM control (S200). Furthermore, finally, when it is determined that the second inverter is out of PWM control, the controller may first switch a torque limit table to a first driving mode torque limit table (S300).

Furthermore, after the switching is completed, the controller may turn on the third switching element to switch to the first driving mode, and may perform motor control (S400).

Therefore, in an open-end winding driving mode to perform pulse width modulation control for all of two inverters, even when one inverter malfunctions, a motor may be stably driven by the other inverter, thereby improving system stability and traveling convenience and maintaining durability.

Hereinbefore, the present disclosure has been illustrated and described in relation to specific embodiments. However, it will be obvious to those skilled in the art that the present disclosure can be variously modified and changed within the scope of the following claims.

What is claimed is:

1. A motor driving device for driving a motor having multiple windings corresponding to multiple phases, respectively, the motor driving device comprising:
    a first inverter comprising multiple first switching elements and connected to a first end of each of the multiple windings;
    a second inverter comprising multiple second switching elements and connected a second end of each of the multiple windings;
    a third switching element configured to connect or disconnect the second inverter to or from the motor; and
    a controller configured to implement a first driving mode in which the motor is driven solely by the first inverter among the first inverter and the second inverter through control of the third switching element and a second driving mode in which the motor is driven by the first inverter and the second inverter, the controller having a torque limit table corresponding to each driving mode and being configured to switch the torque limit table to a first driving mode torque limit table when the second inverter malfunctions in the second driving mode.

2. The motor driving device of claim 1, wherein the third switching element is provided between the second inverter and the second ends of the multiple windings.

3. The motor driving device of claim 2, wherein the controller is configured to: turn on the third switching element in the first driving mode such that the third switching element acts as a Y-connection neutral terminal, and turn off the third switching element in the second driving mode such that the motor is driven through the first inverter and the second inverter.

4. The motor driving device of claim 1, wherein the controller is configured to switch, when the second inverter malfunctions in the second driving mode, the torque limit table to the first driving mode torque limit table and then control the third switching element to disconnect the second inverter from the motor.

5. The motor driving device of claim 1, wherein the torque limit table is a data table into which a speed of turn of the motor and an inverter-side input voltage are input and from which maximum control torque of the motor is output.

6. The motor driving device of claim 1, wherein the controller is configured to switch the torque limit table to the first driving mode torque limit table when pulse width modulation control for the second inverter is impossible during malfunction of the second inverter in the second driving mode.

7. The motor driving device of claim 1, wherein the controller is configured to: control the motor to be in the first driving mode when a required output of the motor is lower than a predetermined reference value, and control the motor to be in the second driving mode when the required output of the motor is higher than the predetermined reference value.

8. The motor driving device of claim 1, wherein the controller is configured to control the motor based on the first driving mode torque limit table.

9. A method for controlling the motor driving device of claim 1, the method comprising:
    sensing whether the second inverter malfunctions in the second driving mode by the controller;
    switching the torque limit table to the first driving mode torque limit table by the controller when the second inverter malfunctions; and
    driving the motor by the controller through the first inverter, based on the first driving mode torque limit table.

10. The method of claim 9, wherein in the driving of the motor through the first inverter, the controller switches the torque limit table to the first driving mode torque limit table and then controls the third switching element such that the motor is driven through the first inverter.

* * * * *